United States Patent

[11] 3,603,953

[72] Inventors John E. Lindberg
1211 Upper Happy Valley Road,
Laffayette, Calif. 94549,
Darrel V. McCoy, Oakland, Calif.; Gordon
J. Schanck, Northridge, Calif.; Harry E.
Van Cleef, Jr., San Francisco, Calif.
[21] Appl. No. 661,559
[22] Filed Aug. 18, 1967
[45] Patented Sept. 7, 1971
[73] Assignee said Lindberg, by said McCoy, Schanck,
and Van Cleef

[54] FIRE DETECTOR CIRCUIT
20 Claims, 18 Drawing Figs.
[52] U.S. Cl........................................... 340/228,
340/227.1, 324/97, 340/378, 340/409
[51] Int. Cl............................................ G08b 5/36,
G08b 17/06
[50] Field of Search........................................ 340/227.1,
228, 378–409, 212, 181, 214; 324/97

[56] References Cited
UNITED STATES PATENTS
2,560,753 7/1951 Weinberg..................... 340/214 UX
2,647,237 7/1953 Herbst......................... 340/214 UX
2,820,218 1/1958 Lovegrove.................... 340/214 X
Re. 26,207 5/1967 Sylvander..................... 340/213 X
2,594,771 4/1952 Hladky et al.................. 340/227.1 X
2,588,964 3/1952 Constantino.................. 340/227.1
2,728,904 12/1955 Schafer........................ 340/409
3,024,449 3/1962 Guerth......................... 324/97 X
3,044,296 7/1962 Boddy.......................... 340/228 X
3,238,454 3/1966 Martens....................... 324/97 X
3,271,677 9/1966 Peter et al.................... 324/97 X Primary Examiner—John W. Caldwell
Assistant Examiner—Perry Palan
Attorney—Owen, Wickersham & Erickson ABSTRACT: A temperature detection circuit of the type including an electrical switch actuated by a temperature-detecting sensor at a predetermined critical temperature, and an electrical indicator in series with the switch, for indication of the actuation of said switch. The circuit is characterized by resistance means which is effectually placed in said circuit in series with the indicator only when the switch is actuated, the indicator including means for giving a different indication for each of the following conditions: (1) when the resistance means is effectually in the circuit, (2) when the circuit from the indicator to the switch is open, and (3) when the circuit from the indicator to the switch is shorted.

PATENTED SEP 7 1971
3,603,953
SHEET 01 OF 10
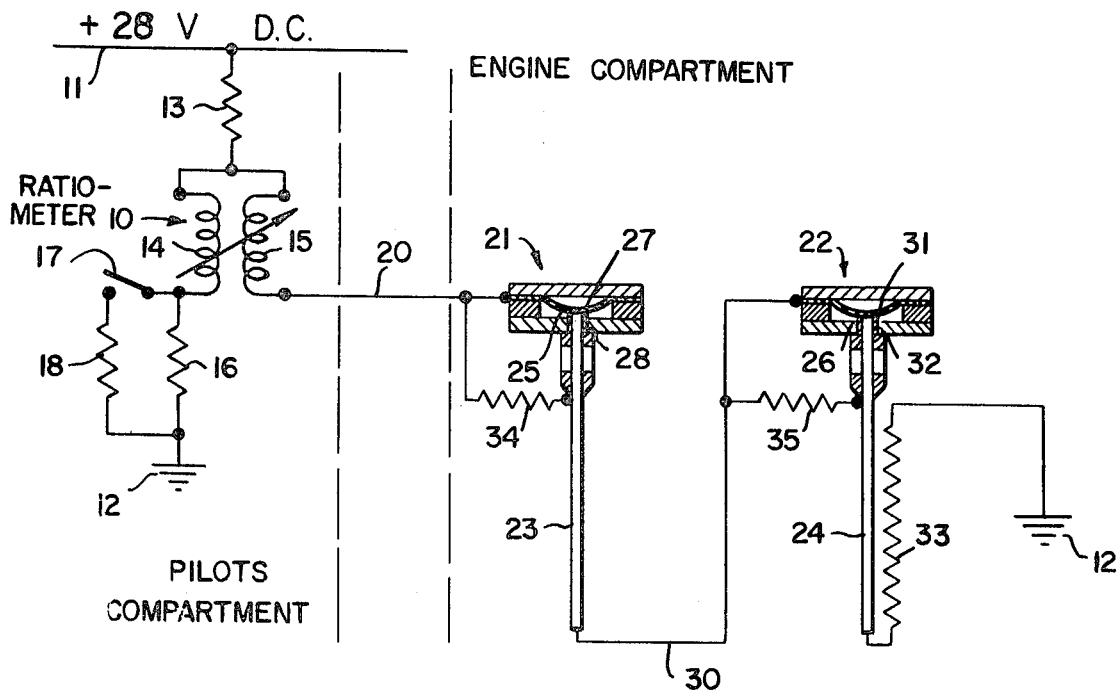
FIG_1
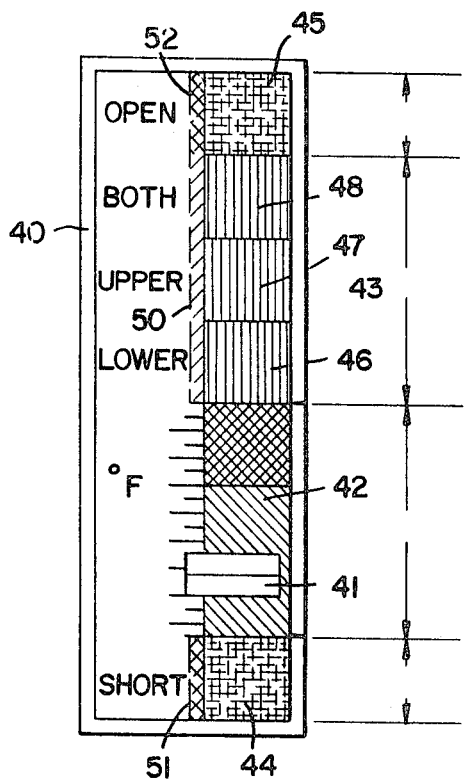
FIG_2
INVENTORS
JOHN E. LINDBERG
DARREL V. McCOY
GORDON J. SCHANCK
H. E. VAN CLEEF, JR.
Owen, Wickersham & Erickson
ATTORNEYS

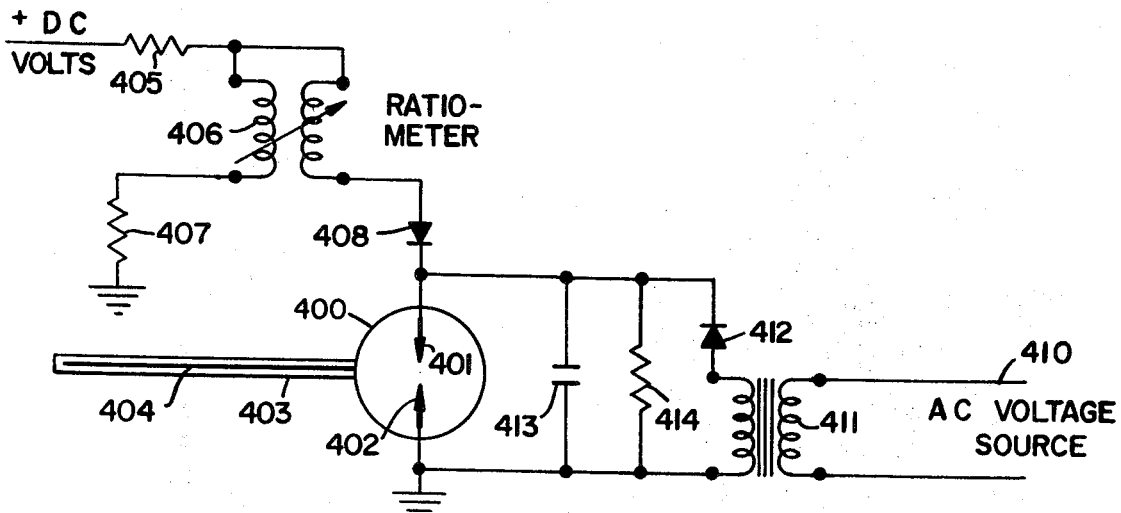
FIG_8
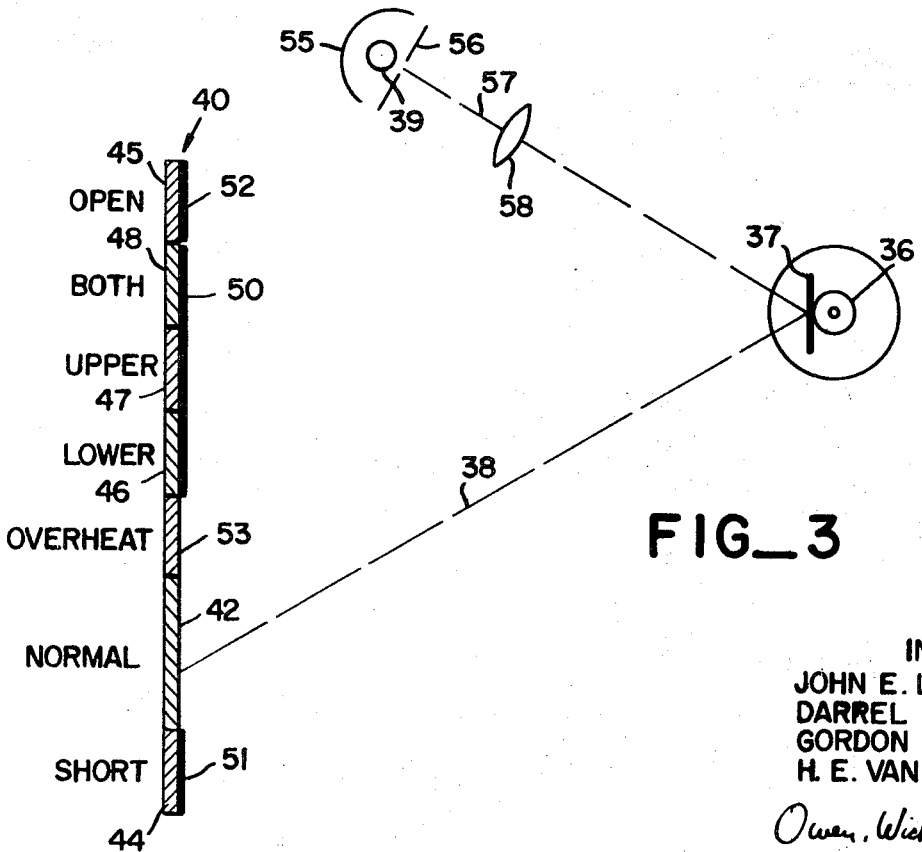
FIG_3
INVENTORS
JOHN E. LINDBERG
DARREL V. McCOY
GORDON J. SCHANCK
H. E. VAN CLEEF, JR.
*Owen, Wickersham Erickson*
ATTORNEYS

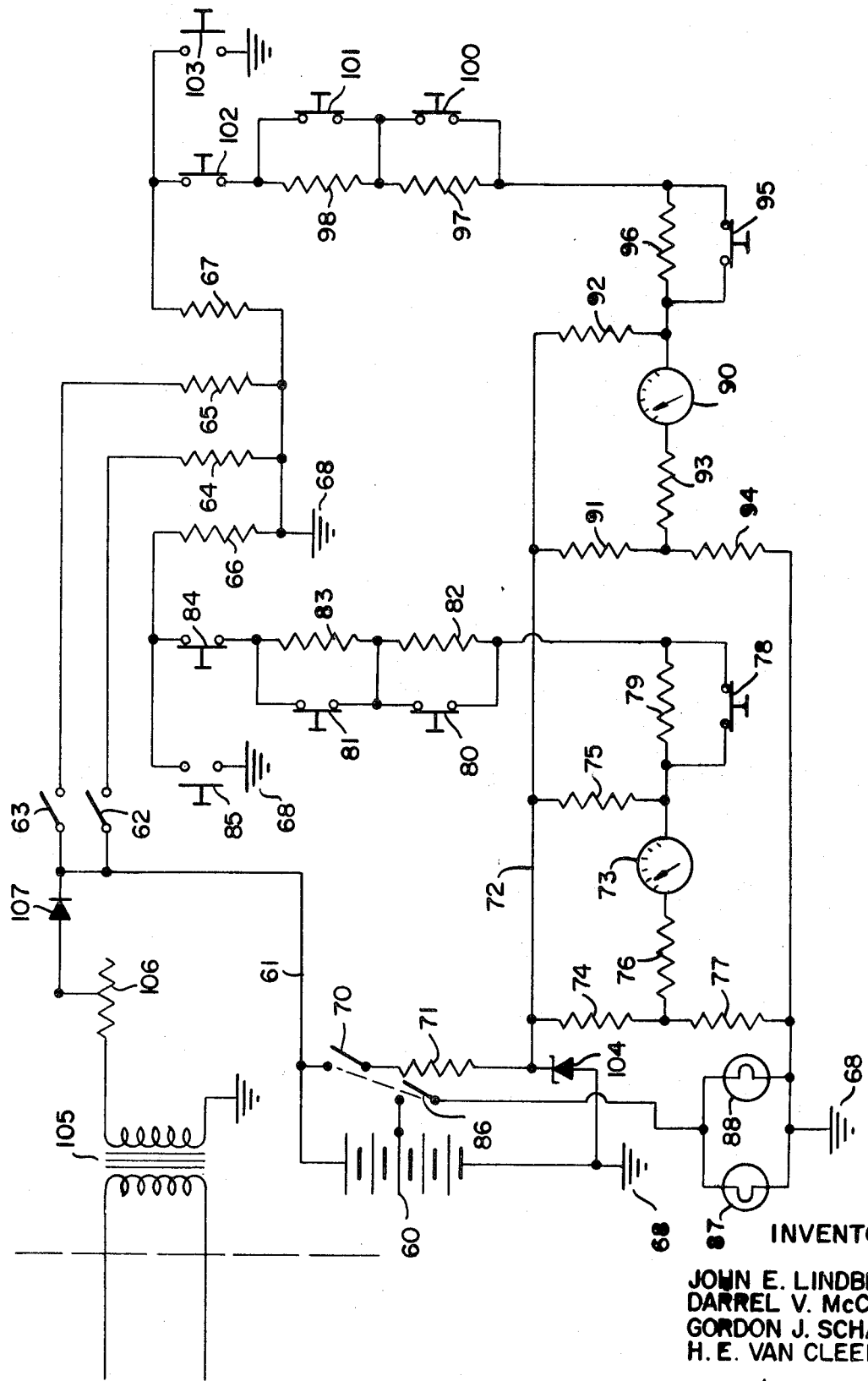
FIG_4
INVENTORS
JOHN E. LINDBERG
DARREL V. McCOY
GORDON J. SCHANCK
H. E. VAN CLEEF, JR.
Owen, Wickersham & Erickson
ATTORNEYS

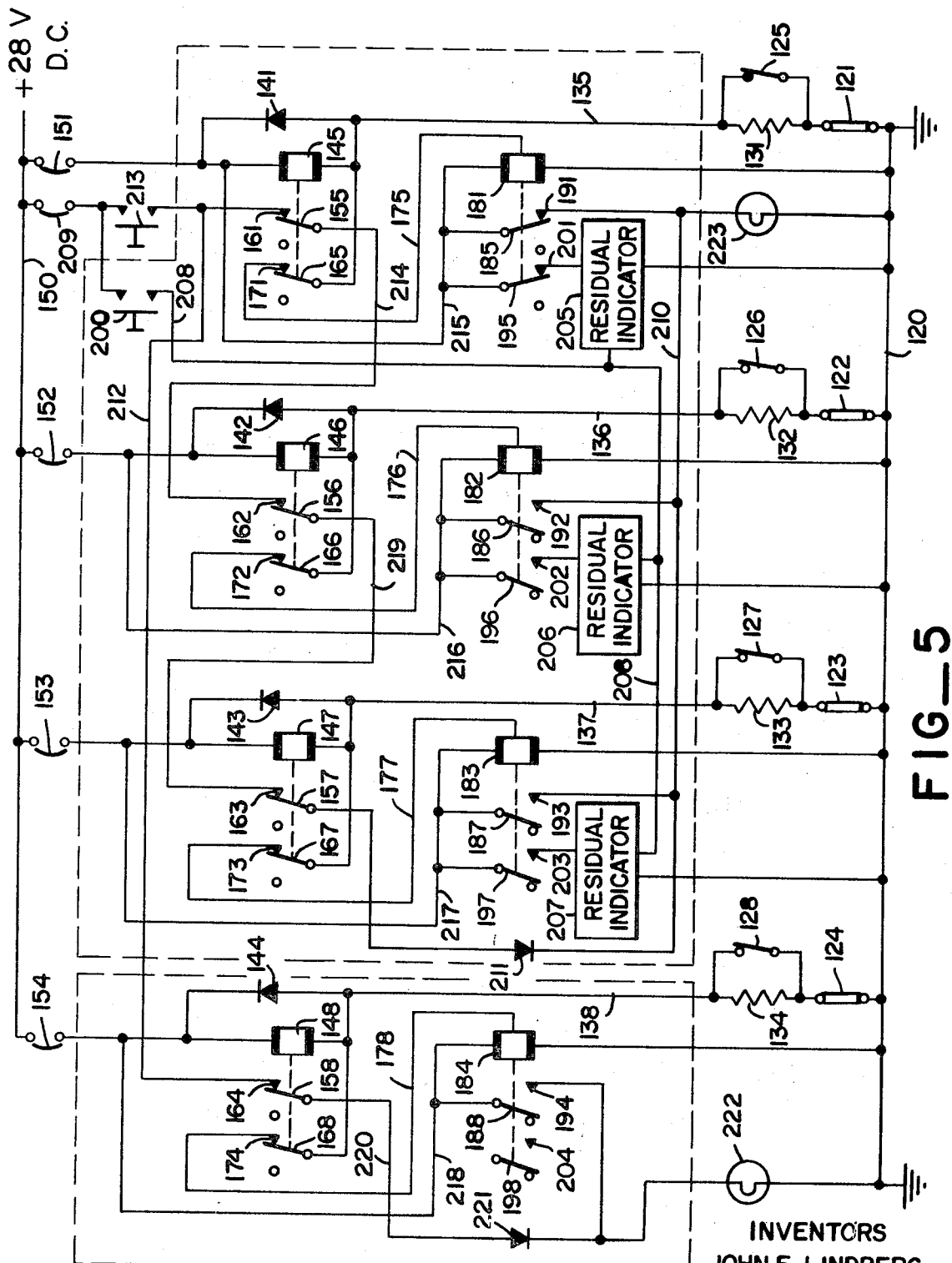

PATENTED SEP 7 1971 3,603,953
SHEET 05 OF 10
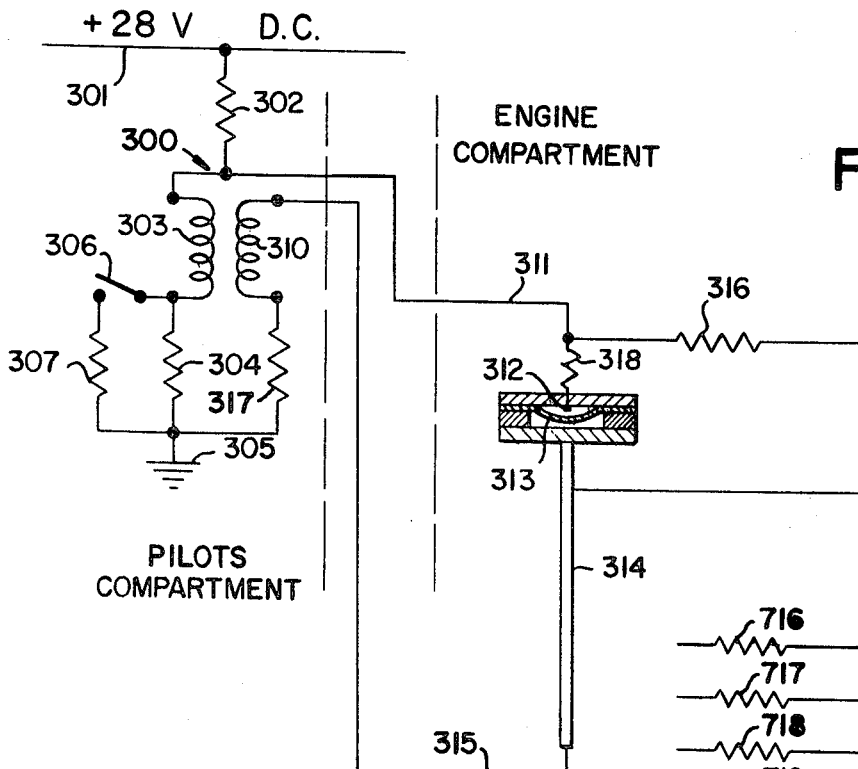
FIG_6
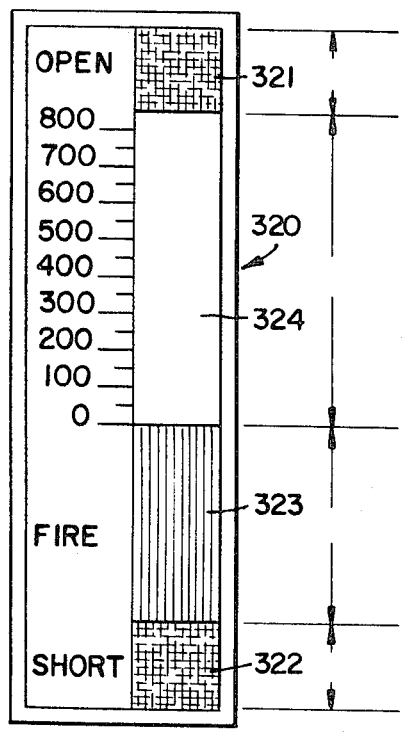
FIG_7
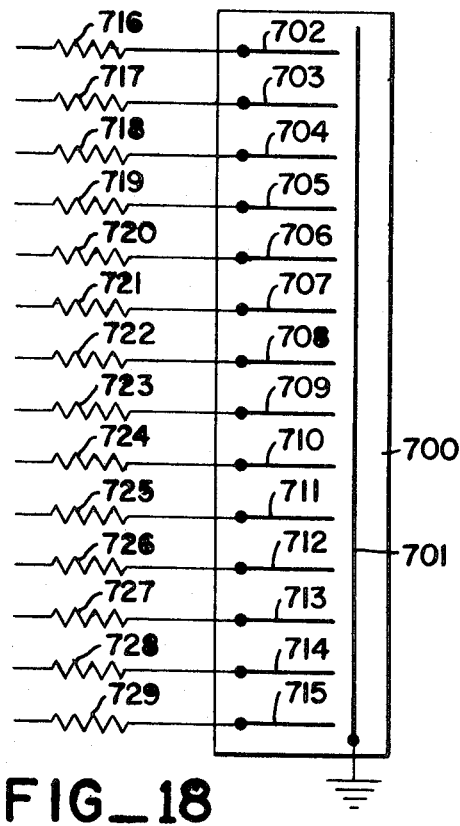
FIG_18
INVENTORS
JOHN E. LINDBERG
DARREL V. McCOY
GORDON J. SCHANCK
H. E. VAN CLEEF, JR.
Owen, Wickersham Erickson
ATTORNEYS

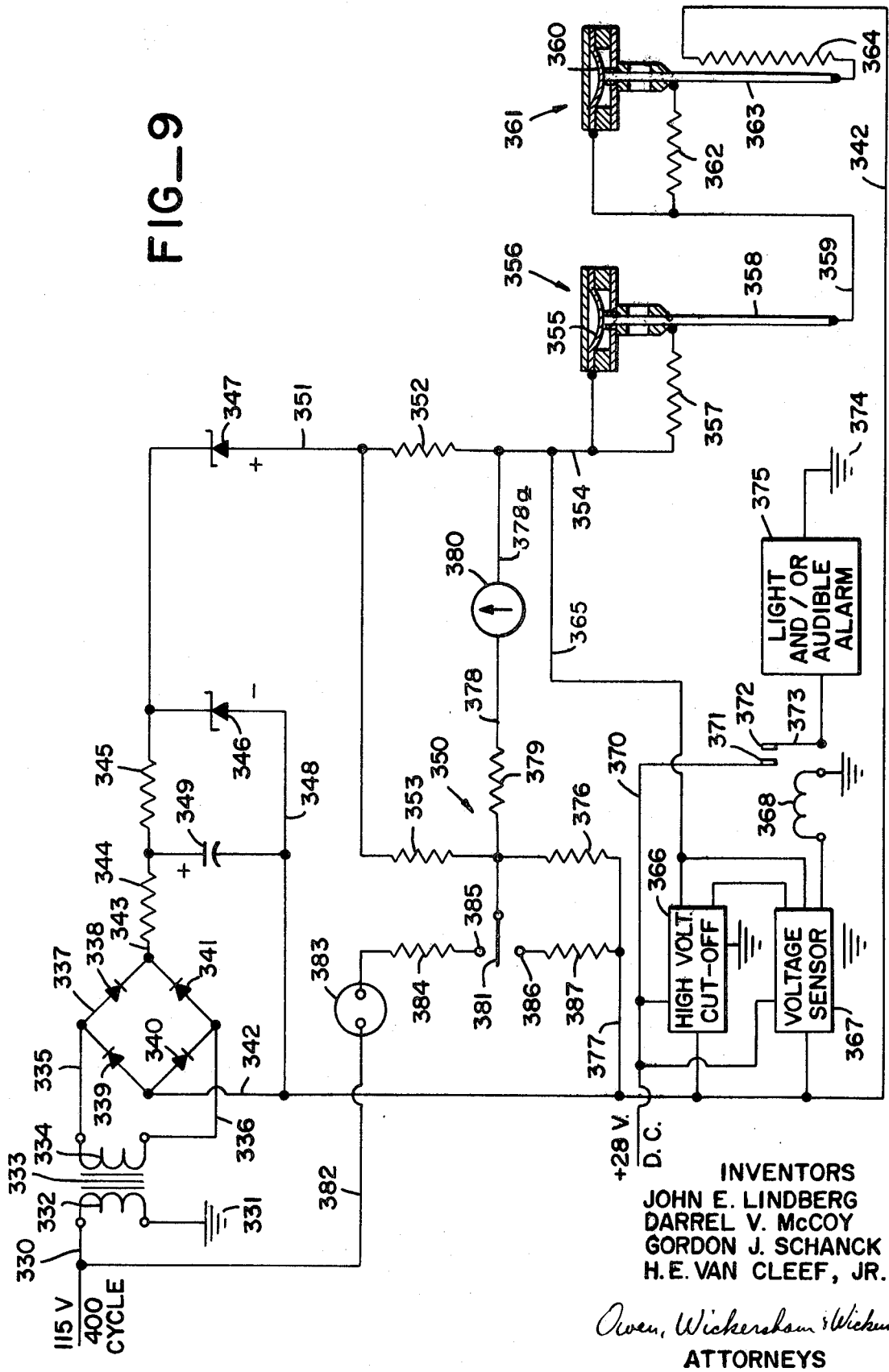

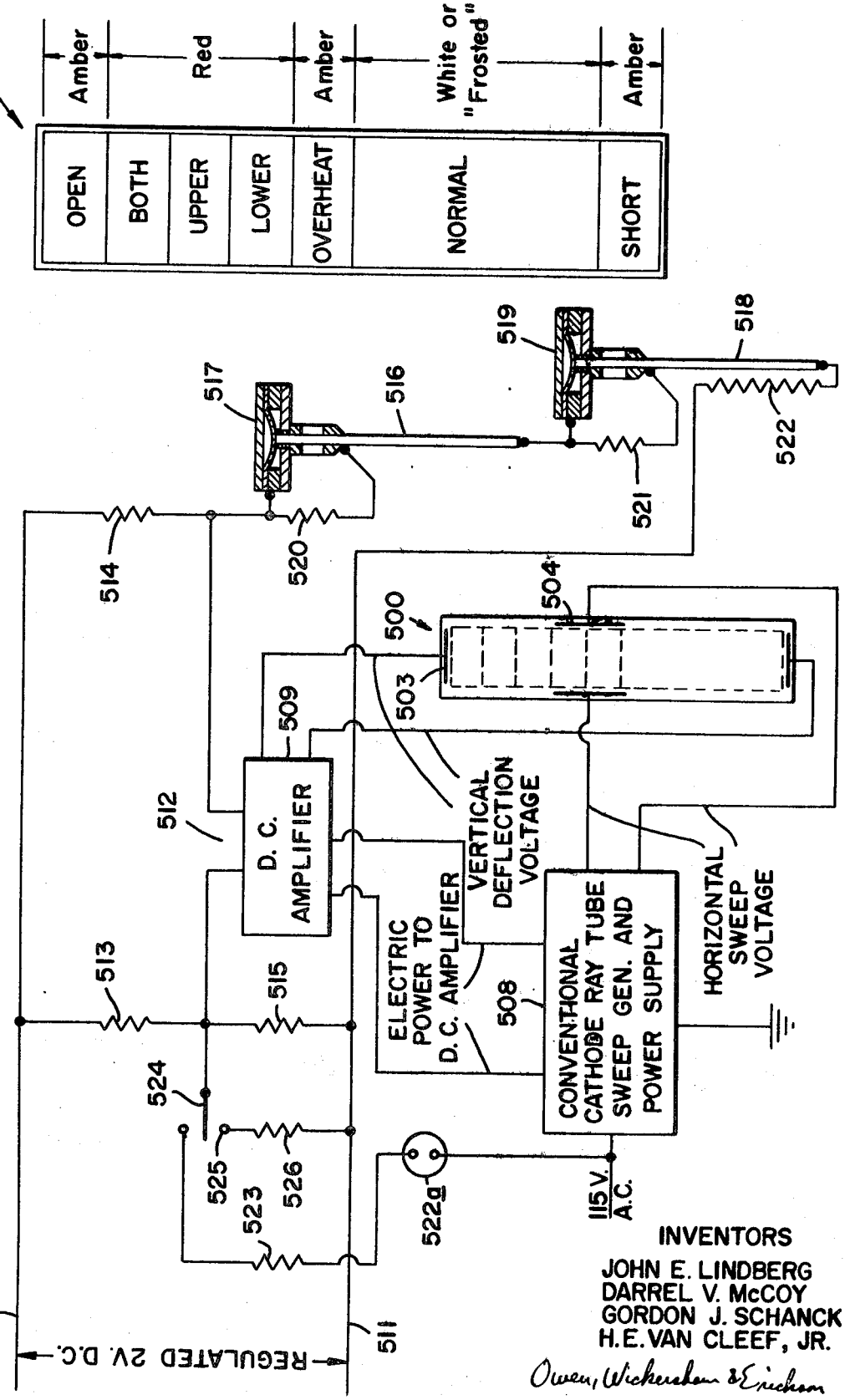

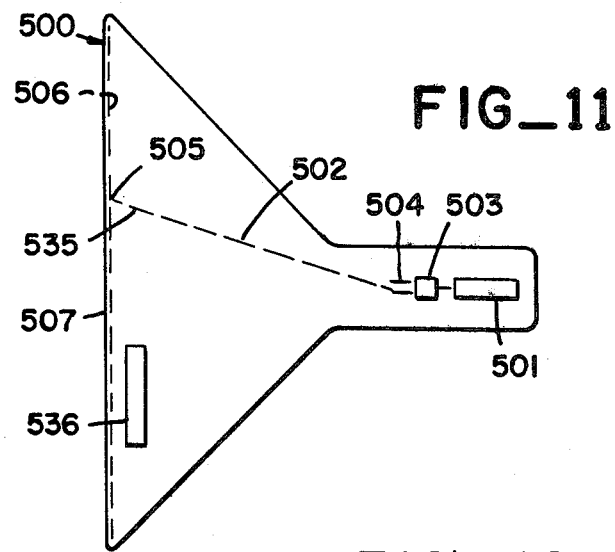
FIG_11
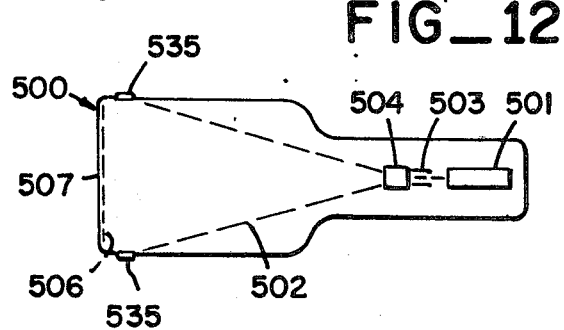
FIG_12
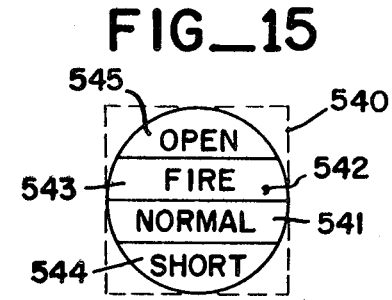
FIG_15
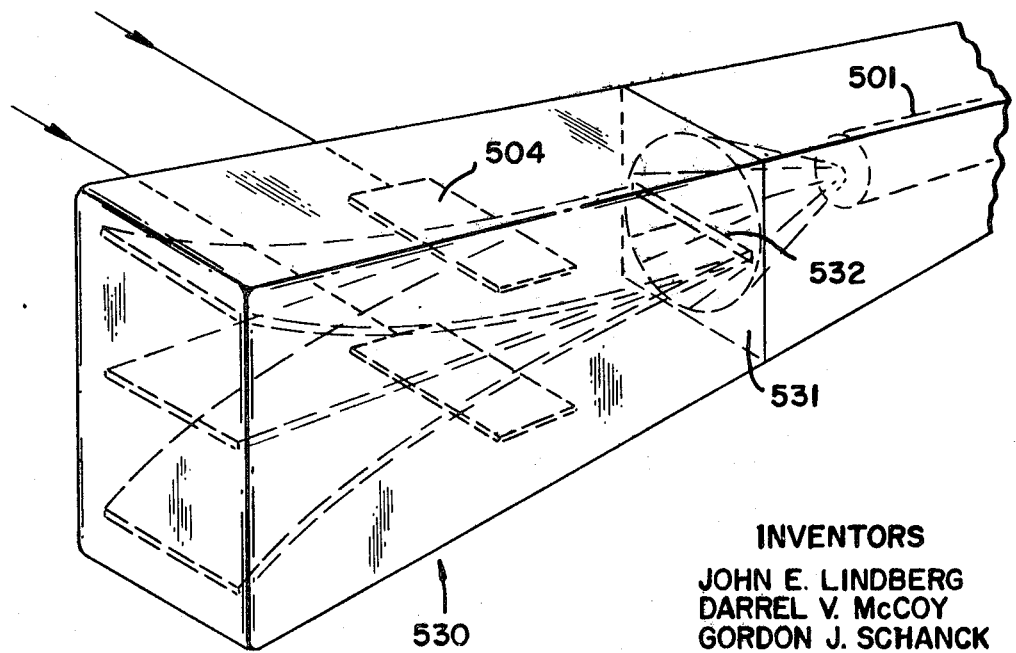
FIG_14
INVENTORS
JOHN E. LINDBERG
DARREL V. McCOY
GORDON J. SCHANCK
H. E. VAN CLEEF, JR.
*Owen, Wickersham & Erickson*
ATTORNEYS

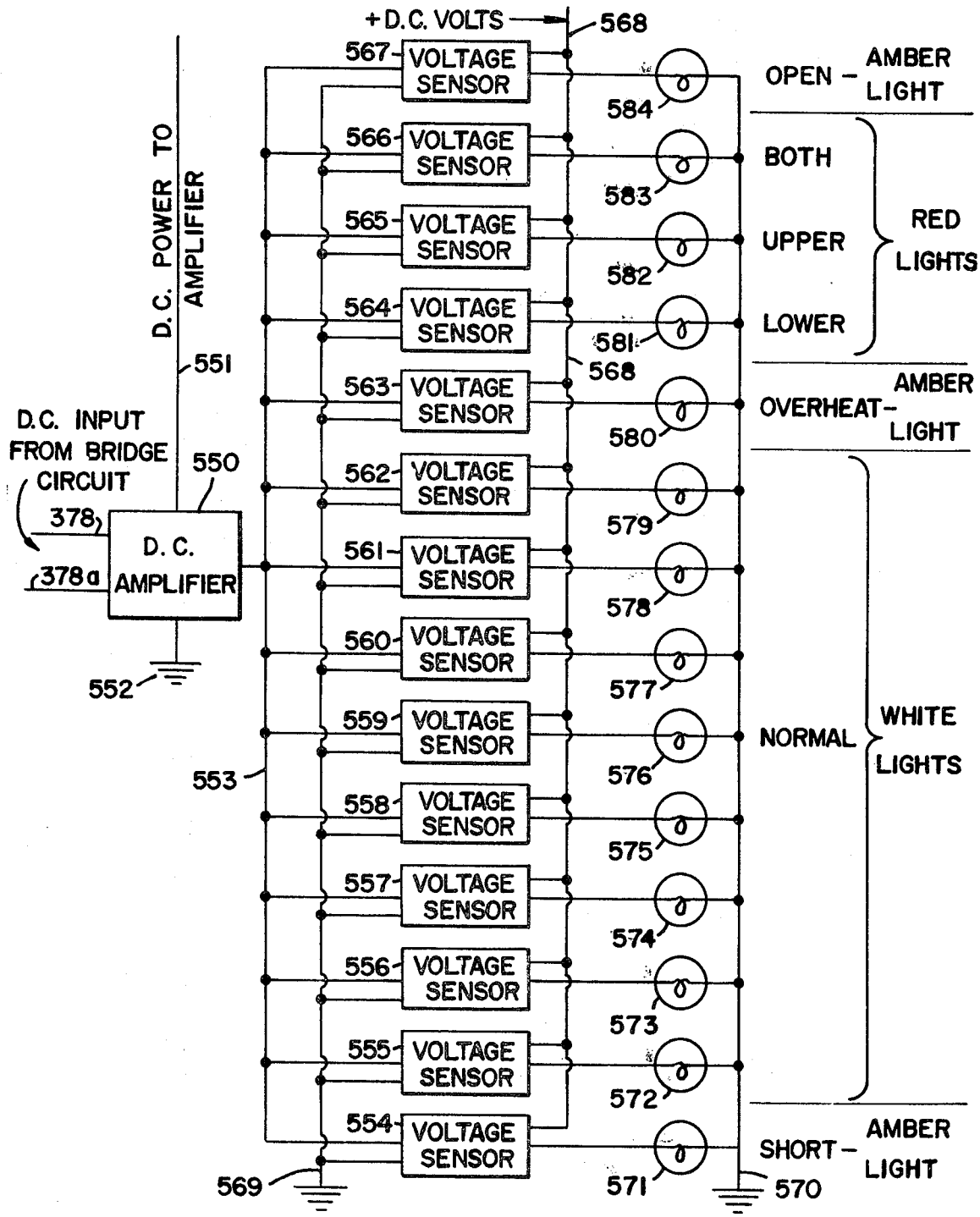
FIG_16

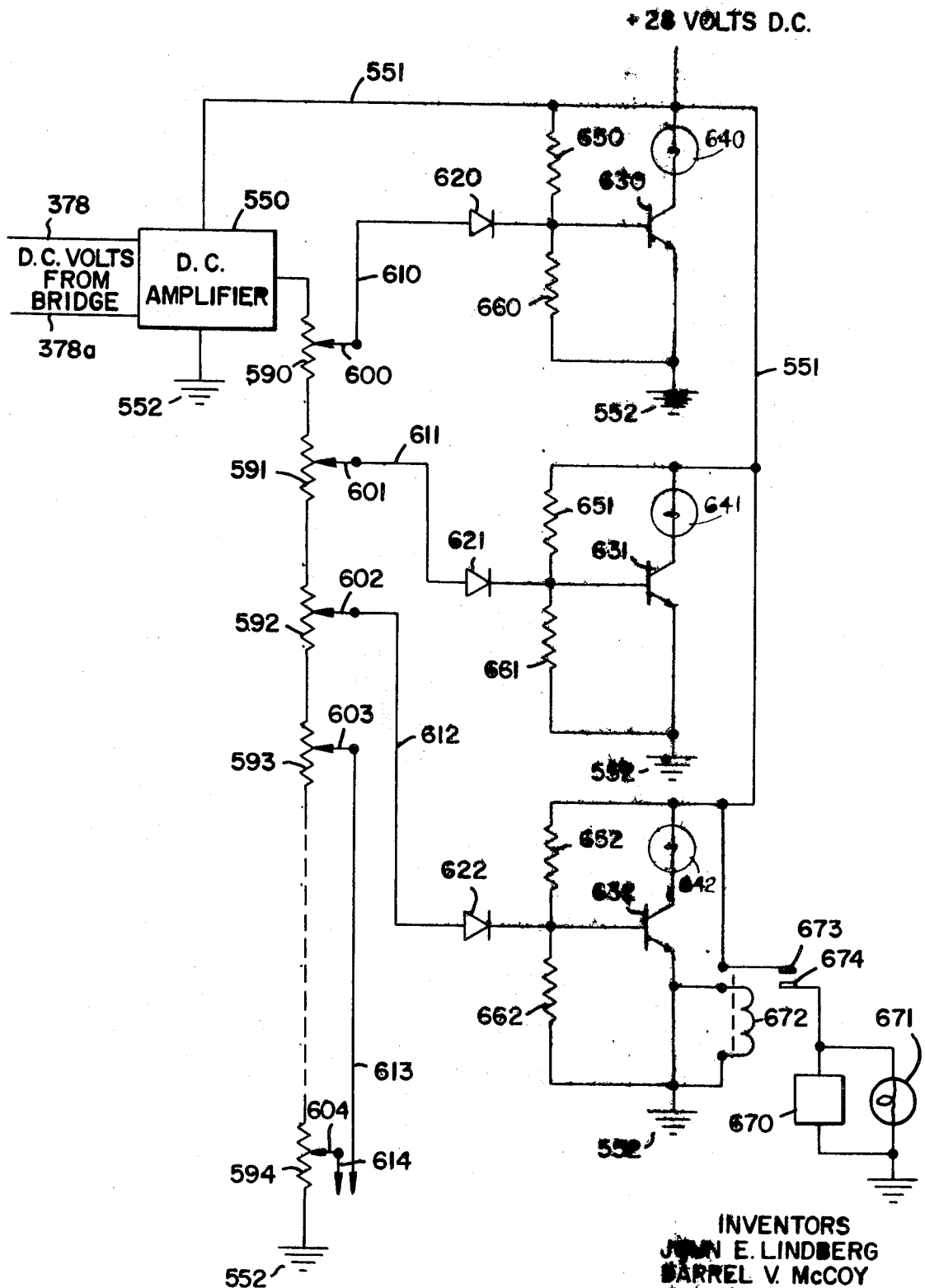
FIG_17

FIRE DETECTOR CIRCUIT

This invention relates to an improved fire detector circuit.

More particularly, it relates to continuously indicating, self-monitoring, self-testing, and self-faultfinding fire detector and temperature detection systems. In addition to providing for both overheat detection and fire detection, it can provide continuous indication of the average temperature of the environment to which the sensor is subjected.

Only one wire plus a ground return is required to each location, such as an engine compartment of an aircraft, and neither breakage of that wire nor a short circuit from that wire to ground can cause a false alarm. Thus, the invention solves the important problem of avoiding false indication and of differentiating between open circuits, grounded circuits and actual operating conditions. If desired, two wires may be used to go to each location, thereby isolating the circuit completely from ground.

Various types of temperature sensing instruments may be used in the invention, including either normally closed or normally open warning circuits. Examples of such instruments are shown in my earlier U.S. Pat. Nos. 3,177,479; 3,180,956; 3,195,121; 3,234,537 and 3,277,860.

By using a structure shown in U.S. Pat. No. 3,234,537, in which the electrical contacts are normally closed and open when an alarm condition occurs, there will be no false alarm even if there is a short circuit across the contacts.

In a system having normally closed contacts, a resistor is connected across the normally closed contacts and is shunted by the closed contacts during normal operation. The resistor has no effect upon the electrical circuit until an alarm condition causes the contacts to open, and them the resistor is in the electrical circuit. A current or voltage indicating means, such as an electric meter or relay or electronic device, is used to detect the effect of the resistor at such times. For example, the meter may be simply a voltmeter which indicates the change of voltage due to the presence of the resistor in the circuit upon the opening of the shunting circuit around the resistor. The meter may be a galvanometer in a bridge circuit, or it may be a ratiometer; a ratiometer can simplify the circuit and give relative freedom from errors due to supply voltage changes; in other words, a ratiometer requires no voltage regulator for the circuit, since it indicates the ratio of the currents through its two coils.

In a basic ratiometer circuit, two coils are wound oppositely around the same moving pole, one such coil being led to the return or ground through a fixed resistance and the other through a variable resistance. The present invention uses the fire detection circuit portion as the variable resistance and utilizes the ratiometer (or other meter) as the indicator. Two fire detectors can be placed in a series arrangement and have the single indicator indicate which sensor is subject to a warning condition or whether both sensors are subject to a warning condition. The meter can also indicate both a break in circuit beyond the ratiometer, giving an open circuit, and a short circuit in that circuit and can differentiate between them. By using a low voltage, in the order of two volts, for the ratiometer and sensing circuit, the short-circuiting effect of salt water and other conductive liquids that under some circumstances may bridge the circuit, is minimized.

Other objects and advantages of the invention will appear from the following description of some preferred forms thereof.

In the drawings:

FIG. 1 is a circuit diagram of a circuit embodying the principles of the invention having two temperature detection sensors in series and differentiating between them.

FIG. 2 is a face-on view of an indicator that may be used with the circuit of FIG. 1.

FIG. 3 is a side view, partly in section and partly diagrammatic of the indicator of FIG. 2.

FIG. 4 is a circuit diagram of a more complex circuit for simultaneous operation of two such devices.

FIG. 5 is a third circuit diagram showing another modified form of the invention.

FIG. 6 is a fourth circuit diagram, showing another modified form of the invention, utilizing, in this instance, normally open warning contacts.

FIG. 7 is a face-on view of an indicator for the circuit of FIG. 6.

FIG. 8 is a circuit diagram of another modified form of the invention, employing an arc-gap instead of contacts in the responder.

FIG. 9 is a circuit diagram of a modified form of the invention employing a full-wave rectifier and a bridge.

FIG. 10 is a circuit diagram of another modified form of the invention employing a cathode-ray tube.

FIG. 11 is a view in side elevation of a cathode-ray tube structure usable in the circuit of FIG. 10.

FIG. 12 is a top plan view of the tube of FIG. 11.

FIG. 13 is an end view of the tube of FIGS. 10–12 showing a warning legend that may be used.

FIG. 14 is a view in perspective of a cathode-ray tube not requiring horizontal deflection plates nor a sweep circuit.

FIG. 15 is a view in perspective of a miniature type of cathode-ray tube for very simplified operation.

FIG. 16 is a circuit diagram of the indicator portion of a modified form of circuit, to which the DC voltage from a bridge like that of FIG. 9 is applied.

FIG. 17 is a circuit diagram of another modified form of indicator portion of the circuit.

FIG. 18 is a circuit diagram of an indicator similar to a nixie tube applied to the transistors of FIG. 17.

In the form of the invention shown in FIG. 1, a ratiometer 10 is placed in the circuit between a source 11 of DC voltage and a ground 12. Between the ratiometer 10 and the plus voltage 11, which may be a 28-volt battery, is a 1,000-ohm resistor 13. The circuit is split at the ratiometer 10 between the two coils 14 and 15. The coil 14 is connected to a standard resistor 16, which may be a 130-ohm resistor, for example, and thence to ground, this branch comprising the reference coil sand reference resistance. In order to enable testing to make sure that the meter 10 is really working, a normally open meter-test switch 17 is provided in series with a low-resistance resistor 18, which may have a value of 4 ohms, for example, the switch 17 and resistor 18 being in parallel with the standard reference resistor 16.

The ratiometer coil 15 is connected by a lead 20 to a temperature detection circuit, which in this instance includes a pair of temperature detectors 21 and 22 of the type shown in my U.S. Pat No. 3,234,537. Each detector 21, 22 has a respective sensor 23, 24 comprising a conductive metal tube containing a gas or gas-producing agent, or both, which, when actuated, open a normally closed diaphragm-type pressure-sensitive switch 25, 26 shown here in diagrammatic form since the precise structure of the sensor and switch are not critical. The lead 20 from the ratiometer coil 15 goes to the diaphragm 27 of the normally closed switch 25, which normally rests against a contact 28 that leads by the conductive sensor tube 23 to a lead 30. The lead 30 goes to the diaphragm 31 of the normally closed switch 26, which is normally against a contact 32 and connects the lead 30 to the conductive sensor tube 24. The tube 24 is connected to the ground 12 through a resistor 33.

The resistor 33 may be made from an electrically conducting material having a high temperature coefficient of resistance. For example, it may be nickel, which has a temperature coefficient of resistance of 0.006 ohms per ohm per degree F. Thereby, a relatively large change in resistance is brought about by each change in temperature. For example, the resistor 33 may have a resistance of 30 ohms at 70° F. and a resistance of about 100 ohms at 600 F.

In parallel with the switch 25 is a resistor 34 which may have a resistance of 100 ohms, for example. Of course, the resistor 34 is bypassed so long as there is the direct short through the closed contacts 27 and 28, but when the diaphragm 27 is moved apart form the contact 28, the resistance of the circuit is increased by the value of the resistor 34, and this added resistance affects the ratiometer 10. In parallel with the switch 26 is a resistor 35, which, for purposes of example, may be 200 ohms, or twice as large as the resistor 34. This resistor 35 adds its resistance to the circuit through the coil 15 only when the switch 26 is open.

The resistor 34 and 35, having different resistances enable discrimination between their sensors 23 and 24, and these may be designated "lower" and "upper" on the indicator shown in FIG. 2. The resistances 16, 18, 33, 34, and 35 are thus chosen so that an indicator 40 (FIGS. 2 and 3) of the ratiometer 10 distinguishes between the various conditions changing the resistance of the circuit through either coil 14 or 15.

The resistor 13 limits the current in the circuit to a value suitable for the meter coils 14 and 15. The resistor 16 is the reference resistor against which the rest of the circuit is balanced. The resistances 34 and 35 are each connected across the closed contacts and are therefore added into the circuit only when the respective detector 21, 22 is actuated by a fire or overheat condition, depending on how it has been set.

The resistor 33 is a temperature-sensing resistance, preferably of uniform cross section, so distributed through its compartment as to measure continuously the arithmetic average temperature of its environment and to cause corresponding indications by the meter 10. The resistor 18 and the meter test switch 17 are only used to tell whether the meter 10 is functioning properly, for introducing the resistor 18 in parallel with the resistor 16 drastically lowers the resistance of the standard coil 14 and causes the meter to move up-scale.

The sensor tubes 23 and 24, being connected in series, serve as electrical conductors, and a broken sensor thereby opens the electrical circuit. Any opening of the electrical circuit beyond the ratiometer coil 15 causes the meter 10 to indicate full scale. Since an open circuit is the only thing that can cause the meter 10 to indicate full scale, a full-scale indicator is recognized as an open circuit and does not give a false alarm. If any point in the circuit becomes shorted to the ground 12, the meter indicates bottom scale and this is recognizable as a short circuit and does not produce a false alarm. Since a short circuit to ground is the only thing that can cause a bottom scale type of operation (except for a broken meter and the meter is readily tested for that), the fact is known.

The meter may have a conventional pointer secured to its moving member 36, or the pointer may be replaced by a mirror 37 (see FIG. 3), as is conventional with many types of galvanometers, to reflect a light beam 38 from a lamp 39 through a translucent scale 40, like that of FIG. 2, the light spot 41 on the scale 40 serving as an attention getter. The lamp 39 may have a reflector 55 and a mask 56 preferably slit like a small rectangle, sending a narrow light beam 57 through a lens 58 to the mirror 37 where it is reflected to the scale 40 and appears as the light spot 41. The scale may be divided into several colored sectors. For example, a green portion 42 may be used for normal temperatures, a red portion 43 for alarm conditions, and a small amber section 44 and 45 may be located at each end, the section 44 indicating a short circuit and the section 45 an open circuit indication, all as shown in FIG. 2. Another sector 53 of still a different color may be used for an overheat condition still below fire conditions or other alarm conditions. As the light spot 41 changes color, moving from one sector to another, the observer is alerted to a change in conditions. The light beam may also serve as a monitor of electrical power, since if the power fails, whether due to a blown fuse, broken wire, or whatever, the light spot disappears. Thus the electrical circuit is completely self-monitoring and self-trouble-finding and is incapable of giving a false alarm from any fault in the sensor circuit.

Whenever there is a temperature condition such as a fire or overheat sufficient to operate the detector 21 and open the diaphragm 27 from the contact 28, the resistor 34 adds its value (e.g., 100 ohms) to the circuit, causing the meter to move into the red sector at a subsector 46, showing that the "lower" sensor 21 is the one giving the alarm. Since resistor 34 and 35 preferably have different values, each causes a unique position of that light beam indicator and identifies which sensor 23 and 24 is giving the alarm, so that the observer knows where this overheat condition or fire condition is. By proper choice of resistance values for the resistors 34 and 35 the indications are in the proper sector regardless of the temperature of the resistor 33. If the sensor 24 is the one where there is a fire or overheat condition, the beam of light 41 is at the "upper" sector 47. If both sensors 23 and 24 are actuated, the resistors 34 and 35 are in series and give a third value, also unique, and the light spot 41 moves to the "both" sector 48 to so indicate.

Prior to any alarm and whether an alarm is eventually indicated or not, changes in temperature are detected by the resistor 33, and the sector 42 may be graduated in degrees or as shown to give both an advanced warning of an alarm and a continuous observation of the temperature where the resistor 33 is located.

When a light-beam-type of indicator is used, the light may fall upon one or more strips of photosensitive material 50, 51, 52 behind the scale at certain desired positions, and the voltage produced or the change of resistance produced may be used to actuate relays or other actuating devices, whether electronic or not, to perform functions such as the sounding of an audible alarm, actuating a fire extinguisher, sending a radio signal to ground or other things. A portion 51 may be used at the short circuit position and a portion 52 at the open circuit position to give indications of these factors and to accomplish some kind of warning or indication. The meter may be made to have its light beam move very rapidly to either scale end, thereby actuating, say, only the "open" position 52, so that if the portion 50 normally actuates a bell, the bell will sound a very momentary ding, which is interpreted then as a warning of an open circuit. If this feature is not desired and it is desired to maintain silence under these conditions, then a time delay apparatus may be incorporated to prevent the audible alarm from reacting to a short duration electrical pulse. This eliminates any possible misinterpretation of the ding. Various types of photosensitive devices may be used, including photovoltaic devices, photoelectric devices, photodiodes, and transistors. Also, various forms of radiation, together with suitable detectors may be used, such as infrared or radioactive materials, and a meter-actuated shield or shutter may be used as an on-off device.

The resistor 33 need not be temperature variable to any significant degree, if that is desired, eliminating only the temperature readout feature. In this instance, the resistor 33 need not be in the fire zone.

A similar sensor-responder circuit may be used with other than meter readouts, such as with relays or other electronic devices, glow lamps, and so on. A relay with a time delay feature may be used to delay an alarm slightly, say to give it a ½-second or 1-second delay so that in case of an open circuit a self-holding relay is caused to drop out, removing electrical power from the system before the alarm can be given and thereby preventing a false alarm.

FIG. 4 shows a demonstrator model of a fire detector system embodying the invention; by a simple substitution of parts which are circuit equivalents the circuit may also represent an actual system of the type often called a "redundant" circuit in which two circuits are provided in order to verify each circuit's response by the other's response. In place of ratiometers, millimeters are used in this particular example.

A normal power supply 60 may comprise a series of rechargeable cells such as light nickel-cadmium batteries having 1.25 volts each, put together to provide a 10-volt direct current. The positive side of the battery 60 is connected by a lead 61 to a pair of heater switches 62 and 63 which control the two circuits. Each switch 62, 63 is connected to a heater unit 64 or 65, which may be 10-ohm heater coils. A heat sensor 66 is positioned adjacent to the heater 64, and a heat sensor 67 is positioned adjacent to the heater 65. These sensors 66, 67 may be like the resistor 33 in FIG. 1 and made of the temperature type of wire therein described, having a resistance of 32 ohms at 70° F. The heaters 64 and 65 and sensors 66 and 67 are connected to a ground wire 68. The heat sensor 66 is used in one of the two circuits, and the heat sensor 67 is used in the other circuit, both of which are substantially identical.

The line 61 at the positive end of the battery 60 is also connected by a switch 70 and a resistor 71 to a positive bus 72 at lower potential than the line 61. A bridge circuit comprises a meter 73, equal resistors 74 and 75 (e.g., 150 ohms) connected to the bus 72, a meter-load resistor 76 (e.g., 4,700 ohms), a reference resistor 77 (e.g. 20 ohms), connected to the ground line 68, and a sensor circuit which contains a meter test switch 78, normally closed, in parallel with a resistor 79.

Two fire detectors like the devices 21 and 22 are represented here by normally closed switches 80 and 81 having respective resistances 82 and 83 in parallel with them. They are in series with the switch 78. In a demonstrator, the switches 80 and 81 may actually be manual switches, or actual fire detectors are used in an actual fire detector circuit. In order to give different resistance values the resistor 82 may, for example, have a value of 200 ohms, and the resistor 83 a value of 100 ohms.

The switch 81 is connected to the ungrounded end of the sensor wire 66 through a normally closed switch 84. The switch 84 may also be grounded through a normally open switch 85 connected directly to the ground wire 68. Thus, closure of the switch 85 simulates a short circuit and its closure will be indicated as described below. Similarly, the normally closed switch 84 may be open to simulate an open circuit.

A switch 86, ganged with the switch 70, leads from a tap on the battery 60 to a pair of lamps 87 and 88. The lamps 87 and 88 light to produce the indicating light beam 57, as described in connection with FIG. 3. The meter 73 is normally balanced by the resistor 77 balancing the resistance wire 66, and moves when any of the switches 80, 81 or 84 is opened or the switch 85 closed, or the resistance wire 66 heated.

The second circuit has a meter bridge also, with a meter 90, resistors 91, 92, 93, and 94, corresponding respectively to (and of equal value to) the resistors 74, 75, 76, and 77. There is, again, a meter test switch 95 in parallel with a resistor 96, and resistors 97 and 98 are in parallel with fire detectors (or simulators) 100 and 101. A normally closed "open circuit test" switch 102 is connected to ground through the parallel paths of the heated wire 67 or the normally open switch 103.

The bus 72 is connected to the ground line 68 through a zener diode 104, which may have a value of 6 volts, back to the ground side of the battery 60. The resistor 71 may have a value of 40 ohms.

A battery charger is provided with a transformer 105 and a potentiometer 106 leading through a rectifier 107 to the lead 61.

The circuit operation in the FIG. 4 device is substantially that described in connection with FIG. 1 except for the use of milliammeters instead of ratiometers, and therefore the reliance on a regulated supply voltage. Otherwise, operation is substantially that of the device of FIG. 1 with the meters having on their scales the various points already described and able to indicate any one of the conditions already discussed.

In FIG. 5 is shown a system employing a lock-in residual indicator in each of a series of circuits for use in a special kind of situation. When a multiple system is used to operate a single warning light—and it is often desirable to have but a single warning light on the instrument panel of an airplane—an indication by the warning light that there is trouble may cause the pilot to shut down the entire system which is responsible for the trouble. For example, if a number of units were monitoring a hot air duct for leakage, leakage at any of several places would lead the pilot to shut down the complete hot air system. Later on, a ground crew making a repair would have to know where the trouble was. By the provision of a lock-in residual indicator, the circuit portion where the trouble is, is easily spotted, even through the pilot did not know precisely where it is. The residual indicator is located in a place not accessible to him, but the ground crew can tell which circuit caused the trouble by observing the residual indicators. The residual indicator retains its information until a manual reset is operated, and then it is in condition to operate again.

In FIG. 5 a series of sensors 121, 122 123, 124 is provided to detect the critical temperatures in various zones, all connected to ground 120. Each sensor is connected to a responder, here represented by a normally closed switch 125, 126, 126 and 128, respectively, and each switch is parallel with a resistor 131, 132, 133 and 134, respectively, just as has been shown in other embodiments of the invention. In each instance, the sensor-responder network is connected by a lead 135, 136, 137, 138 to a diode 141, 142, 143, 144. Each of the leads 135, 136, 137, 138, is also connected to one side of a relay 145. 146, 147, 148, which is placed in parallel with the diodes 141, 142, 143, 144, and the parallel network is connected to a positive bus 150 across fuses or circuit breakers 151, 152, 153, and 154. The positive bus 150 may have a voltage of 28 volts direct current.

Each of the relays 145, 146, 147, 148 controls a pair of switches 155, 156, 157, 158 and 165, 166, 167, 168, all of these switches being normally open. When closed, each switch 155, 156, 157, 158 engages a respective contact 161, 162, 163, and 164, and each switch 165, 166, 167, and 168 when closed, engages a contact 171, 172, 173, 174. Each of the contacts 171, 172, 173, 174, is connected by a lead 175, 176, 177, 178 to a time delay relay 181, 182, 183, 184, each of which is also connected to the ground line 120. Each time delay relay has a pair of normally open switches, respectively, switches 185, 186, 187 and 188 which, when closed, close against contacts 191, 192, 193, and 194 and switches 195, 196, 197, and 198, which, when closed, come against respective contacts 201, 202, 203, and 204. The contacts 201, 202, 203 lead to one side of a residual indicator 205, 206, 207, the other side of which is grounded. The residual indicators are also tied together by a reset lead 208, which goes to a normally open reset switch 200 and thence to the positive bus 150 by a fuse or circuit breaker 209. The contacts 191, 192 and 193 are connected together by a lead 210 which comes from the switch 157 via a diode 211 which prevents current flowing back from them to the switch 157. The tim delay relays 181, 182, 183, 184 and their contacts 185, 186, 187, 188 and 195, 196, 197, 198 are connected to the positive bus 150 by leads 215, 216, 217, 218 and the fuses or circuit breakers 151, 152, 153, 154.

The contacts 161 and 164 are connected together by a lead 212 and to the bus 150 by a normally open test switch 213 and the fuse or circuit breaker 209. The contact 162 is connected by a lead 214 to the switch 155, and the contact 163 is connected by a lead 219 to the switch 156. The switch 158 is connected by a lead 220 through a diode 221 to an indicator lamp 222 and also through the switches 155, 156 and 157 and through the diode 211 and the lead 210 to a lamp 223, which lights, provided that all the relay contacts are closed. There may also be a bell in the circuit between the lead 210 and ground 120.

When any one of the sensors 121, 122, 123, and 124 is energized, its normally closed switch 125, 126, 127, or 128 is opened, and the resistor 131, 132, 133 or 134 in parallel with that switch becomes active in the circuit. The respective normally energized control relay 145, 146, 147 or 148 is affected by resistance 131, 132, 133 or 134 becoming effective, but enough current still flows to hold in the relays 145, 146, 147, and 148. The rise in voltage above the particular resistor which happens to be in operation due to operation of this one of the sensors, is then applied to the respective time delay relay 181, 182, 183, or 184 through the control relay 145, 146, 147, or 148; the time delay relays 181, 182, and 183 respond by closing their switches, which respectively operate the residual indicator and the warning light 223. The time delay relay 184 has no residual indicator as none is needed there, for it operates its own warning light 222. The time delay is advisable because an open circuit in the sensor-responder circuit otherwise gives what could be interpreted as a false alarm. The time delay prevents that, because if the current in the control relay 145, 146, 147 or 148 drops to zero, its switches 155, 156, 157 or 158 and 165, 166, 167, or 168 open, removing the voltage from the time-delay relay 181, 182, 183 or 184 before the time delay relay could itself operate, and no warning signal is given.

The test circuit through the switch 213 is used to see whether the control relays 145, 146 or 147 are inoperative, for if any one of them is, the light 223 will not light. Similarly the relay 148 and its lamp 222 may be tested. The reset switch 200 is accessible only to the ground crew. When it is pressed, it releases all the residual indicators 205, 206, 207 to return to normal.

FIGS. 6 and 7 show a somewhat different system in which the temperature detector has a responder with normally open contacts like that shown in U.S. Pat. No. 3,277,860. The circuit is purposely made generally to resemble the FIG. 1 circuit although, by way of example, only a single sensor-responder unit is shown here. A ratiometer 300 is connected to a plus bus 301 through a resistor 302. The reference coil 303 of the ratiometer is connected through the reference resistance 304 to ground 305 and a test switch 306 and low value resistor 307 are placed in parallel with the resistor 304. The resistor 302 is connected to a lead 311 which goes to a normally open contact 312 of a responder circuit having a diaphragm 313, which is actuated to close against the contact 312 when gas pressure inside a sensor housing 314 reaches a desired figure. The diaphragm 313 is electrically connected to the sensor 314, which is connected at its distal end by a lead 315 to one side of the action coil 310 of the ratiometer 300; the other side of the coil 310 is connected through a resistor 317, of fixed value, to ground.

A resistor 316 shunts around the responder, between the contact 312 and the diaphragm 313, and when the diaphragm 313 closes against the contact 312, the effect of the resistor 316 is removed by the shunt around it. The resistor 316 may be a heat sensitive one like the resistor 33, or it may be of a fixed value, making the system a "spot temperature" detector.

There is also a resistor 318 in series with the responder preferably between the responder contact 312 and the point at which the parallel attachment to the resistor 316 is made. This enables one to distinguish between the fire warning and a complete short in the circuit between the lines 311 and the lines 315.

FIG. 7 shows a panel 320 used with the FIG. 6 circuit, having an open circuit indicating portion 321, a short circuit indicating portion 322, a fire-warning portion 323, and a temperature indicating portion 324. The indicator moves rapidly from the upper range of the portion 324 to the portion 323 when there is a fire.

FIG. 8 shows another modified form of the invention, characterized by a responder 400 having spaced-apart contacts 401 and 402. A sensor 403 comprising a tube in communication with the interior of the responder 400 forms therewith a sealed system. A source 404 of a suitable gas is distributed along the length of the sensor 403 in such a way as to enable the gas to flow freely therealong. For example, the source 404 may be a wirelike metallic hydride, such as zirconium or titanium hydride, which, when heated above a threshold temperature reversibly emits hydrogen gas. The interior of the tube 403 and of the responder 400 may be filled with a small amount of gas; for example, a mixture of 99.9 percent neon and 0.1 percent argon, at below atmospheric pressure. At such pressure, conductivity through the gas between the electrodes 401 and 402 is poor, but as pressure is increased slightly by heating the sensor 403, conductivity improves rapidly until an optimum pressure is reached, and then further increase in pressure decreases conductivity. Moreover, when hydrogen is emitted from the source 404, the hydrogen tends to quench the arc, and, as hydrogen is taken up by the source, the neon-argon mixture again becomes conductive. This is strictly an on-off type of action.

A resistor 405 (corresponding to the resistor 13 in FIG. 1) connects the positive DC bus to a ratiometer 406, one coil of which is led to ground through a standard resistor 407. The other coil goes to the electrode 401 through a diode rectifier 408. In addition to the DC voltage, and AC voltage source 410 is used with a transformer 411 to apply a high enough voltage, rectified through a diode 412, to enable arcing across the electrodes 401 and 402. The diode 408 blocks the AC from the ratiometer 406, and the diode 412 prevents negative excursions of voltage from the transformer 411, from occurring on the positive side of the arc-gap and blocks DC voltage from passing to the transformer winding.

Preferably, a capacitor 413 and a resistor 414 are placed in parallel shunting across the arc-gap of the responder 400. The capacitor 413 assists in sustaining the arc, while the resistor 414 provides for DC conductivity in the ratiometer circuit when the arc is not conducting, and also enables the capacitor 413 to discharge. If desired, the resistor 414 can be used to detect temperature changes other than what is detected by the on-off action of the arc gap, by detecting current or voltage variations in the resistor 414.

The circuit of FIG. 9 basically resembles that of FIG. 1, but has some significant differences. By way of example, the current source is shown as alternating current, such as 115-volt 400 cycle current, coming in by line 330 and returning via a ground 331 after going through the primary 332 of a transformer 333. The secondary 334 of the transformer 333, may produce for example, a voltage of 14 volts across leads 335 and 336. These leads 335 and 336 are connected to a full-wave rectifier 337 comprising four diodes 338, 339, 340, and 341, which are connected in bridge fashion to the leads 335 and 336 at diagonally opposite ends and to output leads 342 and 343 at the other two opposite points.

The output lead 343 goes through two successive resistors 344 and 345, which may be 10 ohms each, to two Zener diodes 346 and 347. The Zener diode 346 may be a 12-volt diode connected by a lead 348 to the lead 342. In between the two resistors 344 and 345, a capacitor 349, which may have a capacitance of 100 microfarads, is connected to the lead 348 in order to filter out rectified AC. The second Zener diode 346, which may be a 10-volt one, is connected to a lead 351. This illustrative circuit is a little more complex than may be necessary, but is shown because 10-volt and 12-volt Zener diodes are available but 2-volt Zener diodes are not, and the purpose here is to subtract the 10 volts from the 12 volts to obtain a 2-volt DC output of the power supply.

The lead 351 goes to parallel resistors 352 and 353, for example of 60 ohms each. A lead 354 from the opposite end of the resistor 352 is connected to the diaphragm 355 of a normally closed responder 356, like the one in the detector 21 in FIG. 1. The lead 354 is also connected through a resistor 357, which may be 100 ohms, to a conductive sensor housing 358. The end of the sensor 358 is normally closed against the diaphragm 355 except when pressure of gas in the sensor forces the diaphragm 355 to open this connection and thereby to send current from the line 354 to the sensor 358 only through the resistor 357.

A lead 359 from the distal end of the sensor 358 goes to a second diaphragm 360 in a second responder 361 and, in this instance, a resistor 362, which may be 200 ohms, is used to connect the lead 359 to a conductive sensor casing 363. Below the warning temperature, the current passes through the diaphragm 360, which is normally closed against the sensor 363, but when temperature conditions change the gas pressure in the sensor 363 and cause the diaphragm 360 to open, then the current must pass through the 200-ohm resistor 362. The other end of the sensor 363 is connected by a sensing resistor 364 to the line 342, the return line leading to the opposite side of the full-wave rectifier 337.

A lead 365 goes from the lead 354 to a high-voltage cutoff device 366, the other side of which is connected to the return line 342. The lead 365 also connects the lead 354 to the return line 342 across a voltage sensor 367 which controls a relay 368. Both the voltage sensor 367 and high-voltage cutoff device 366, while commercially available separately, may be obtained commercially as a single unit. A 28-volt DC source is connected by a line 370 to a normally open contact 371. An opposite contact 372 on a switch arm 373 is controlled by the relay 368, which, when closed, returns the 28-volt DC current to ground 374 through a light or other visual or audible alarm device 375.

The resistors 352 and 353 are part of a bridge 350 used for the indicator in place of a ratiometer. The resistor 353 is connected via a resistor 376, which may for example be 39 ohms, and a lead 377 back to the return line 342. The sensors 358, 363 and their associated circuitry comprise the fourth arm of the bridge 350. A cross connection 378 leads from between the two resistors 353 and 376 through a resistor 379 to a DC milliammeter 380, and from there a lead 378a extends to the line 354. The resistor 379 may have a rating of 1,220 ohms, and the milliammeter 380 may have a scale from zero to one milliampere.

To learn whether the circuit has been accidentally grounded, a ground detection switch 381 is provided, connected to the resistor 379. A branch line 382 from the main AC power line 330 leads through a neon lamp 383 and a resistor 384, which may have a 200,000-ohm resistance, to a normally open contact 385. When the test switch 381 is closed against the contact 385, the neon lamp 383 will light if there is a ground in the circuit to which the test switch 381 is connected; otherwise, the lamp 383 will not light.

The switch 381 may also be used as a meter test switch, to close against a normally open contact 386 which leads to the return line 342 through a resistor 387, which may have a 4-ohm resistance.

Thus, the circuit of FIG. 9 uses AC power, rectified to give a low DC voltage, and a bridge 350. It enables complete isolation from ground, since there is a return line 342. This type of circuit reduces the difficulties encountered when the circuit is immersed in salt water and, wherever connectors may be grounded at one location in the circuit; it enables the circuit to have a single fault to ground and still operate.

The voltage sensor 367 is adjusted to be sensitive to any voltage across the bridge which would cause an alarm indication on the meter 380, and such a voltage also causes the voltage sensor 367 to actuate its relay 368, closing the switch 373 and actuating the warning light 375 and/or the audible alarm, or any other warning device. The voltage sensor 367 is actuated from the basic bridge circuit without grounding it and without affecting its operation.

The voltage sensor 367 is provided with a built-in time delay, as for example, one-half second, and when a signal voltage exceeds the alarm level, as in the case of an open circuit which causes full-scale meter deflection, the high-voltage cutoff 366 acts more rapidly than the voltage sensor 367 to deactuate the circuit it controls and to prevent the voltage sensor 367 from actuating its relay 368, thereby preventing a false alarm due to an open circuit. The sensing portion of the voltage sensor 367, and the high-voltage cutoff 366 are returned to the line 342 of the bridge below the lead 377, because their voltages and voltage changes are greater than what is in the bridge 350, and the scale compression needed for the meter 380 is not needed for these elements. A feature such as this may also be included in systems using a ratiometer, such as the FIG. 1 circuit, or may be used with the cathode-ray tube indicator described below.

A circuit of this invention employing a cathode-ray tube is shown in FIG. 10, and the structure of a suitable cathode-ray tube 500 for such circuit is shown in FIGS. 11–13. A conventional electron gun 501 generates an electron beam 502, a point 505 on a phosphor screen 506 on the face 507 of the tube 500. A conventional sawtooth voltage generated from a conventional generator and power supply 508 is applied to the horizontal plates 503 to cause the beam 504 to produce a horizontal line on the face of the tube. The electrical signal from the temperature detection circuit is applied through an amplifier 509 to the vertical deflection plates 504, causing them to deflect the beam to the corresponding vertical position on the front face 507 of the tube.

In the circuit shown in FIG. 10, the sensors and their normally closed responders are like those shown in FIGS 1 and 9. A regulated voltage supply of 2 volts DC (for example) is impressed across lines 510 and 511. A bridge 512 is formed by resistors 513, 514, and 515 and by the detection circuit. The detection circuit comprises a first sensor 516 with a normally closed responder 517 and a second sensor 518 with a normally closed responder 519. Resistors 520 and 521 correspond to the resistors 357 and 362 in FIG. 9, and a temperature detection resistor 522 is included. The resistor 520 may have a resistance of 100 ohms, the resistor 521 a resistance of 200 ohms, and the resistor 522 a resistance of 50 ohms at 70° F. The resistors 513 and 514 may have a resistance of 60 ohms each, and the resistor 515 a resistance of 39 ohms.

A ground detection neon bulb 522a may be used, in series with a resistor 523 having typically a resistance of 50,000 to 300,000 ohms, controlling the brightness of the bulb 522a. The test switch 524 is like the switch 381 in FIG. 9, and may also be used to test the indicator, when closed against a contact 525. The contact 525 is joined to the line 511 either without or through a resistor 526, which may have a value of one ohm, for example. In place of the location shown, the switch 524 may be across the resistor 514.

As in the case of meters, the display may be divided into several colored sectors by the use of transparent overlays, or the same result may be achieved by using different colored phosphors for the various segments.

The structure shown in FIG. 14 enables obtaining a horizontal line on the screen without either horizontal deflection plates or a sawtooth sweep generator. In the cathode-ray tube 530 and in this form of the invention, a mask 531 with a small rectangular slit 532 is mounted on the beam axis in the position that would otherwise be occupied by the horizontal plates. The beam diameter is made large enough to cover the slit 532. The emerging beam, therefore, has the cross section of the slit 532 and appears on the screen as a horizontal line.

A feature of the cathode-ray tube type of indicator is the availability of electrical signals without the requirement of additional transducers. Hermetically sealed electrodes 535 are mounted in the sidewall of the tube, as shown in FIGS. 11 and 12. The horizontal sweep is made wide enough so that the electron beam 504 impinges on these electrodes 535 and, depending on the secondary emission ratio, either a positive or negative signal is obtained. The range of the scale over which the signal is generated may be extended and controlled by applying surface electrodes 536, which are electrically connected to the through fittings.

A further simplified version of the cathode-ray tube indicator is shown in FIG. 15. A small cathode-ray tube 540 about 1 inch in diameter, either round or square, is used. In this version the temperature-sensing resistor is not used and the "normal" indication is at a fixed position 541 on the face 542 of the tube 540. All features other than temperature measurement can be retained, the operation being identical to that of the larger cathode-ray tube. Thus there is a "fire" position 543, a "short" position 544, and an "open" position 545. One or two or more fire positions may be included, depending upon how many sensor-responders are included in the circuit.

The circuit of FIG. 16 relates to a modified form of indicator that can be used in connection with a bridge-type of circuit such as that shown in FIG. 9. In place of the milliammeter 380, a DC amplifier 550 is placed across the leads 378 and 378a one beside the other in a horizontal row. A lead 551 from a DC power source supplies power to the amplifier 550, and return of this power may be by ground 552. An output bus 553 is connected to each of a series of voltage sensors 554, 555, 556, 557, 558, 559, 560, 561, 562, 563, 564, 565, 566, and 567, supposing that 14 lights 571, 572, 573, 574, 575, 576, 577, 578, 579, 580, 581, 582, 583 and 584, for example, are to be used, but more lights or fewer lights can be used and any combination of colors desired may be used. Each voltage sensor is set to sense a different voltage and, when the level of voltage is achieved, it closes a circuit to supply power from a lamp power supply bus 568 to its particular lamp. A negative bus 569 for the voltage sensors and a negative bus 570 for the lamp supply returns. The lights are lighted progressively from bottom to top as increasing voltages are developed across the sensing bus 553 due to the increase in resistance in the detecting elements.

The DC amplifier 550 used to sense the changing voltage in the detector circuit may be applied to an indicator circuit similar to a conventional electronic digital voltmeter, which switches its output from one light to the next above light as its input voltage is increased or to a lower light as the input is decreased, but in the embodiment shown, all lights remain lighted as voltage increases, except that the bottom lamp 571 used to detect short circuits is set to be actuated only when the sensed voltage drops below a certain level. The lamp 571 may be amber, as may the open-circuit lamp 584 at the top, and the fire-warning lamps 581, 582, and 583 may be red. The overheat lamp 580 may be amber or some other distinguishing color. The "normal temperature range" lamp 542 through 579 may be white, and as the block enlarges, it attracts the attention of the pilot or copilot. The indicator lights may be incandescent lights or neon lamps.

FIG. 17 shows a modified form of the circuit of FIG. 16 using a DC amplifier 550 across the DC leads 378 and 378a. Once again, the DC amplifier 550 is supplied with DC power through a line 551 and a return, shown as ground 552. The output from the DC amplifier passes to a series of voltage dividers 590, 591, 592, 593, and 594. Between the dividers 593 and 594 there may be a series of such voltage dividers, any number desired. Each voltage divider includes a potentiometer terminal 600, 601, 602, 603, 604, and so on, each which is used to set the voltage divider for a different desired output voltage into its line 610, 611, 612, 613, 614, etc. In place of the adjustable set points provided by the potentiometer fixed set points may be used, if desired. Each output lead 610, 611, 612, 613, 614, etc. passes through an individual diode 620, 621, 622, etc. to isolate the bias voltages of the transistors 630, 631, 632, etc., (one of which is connected to the opposite side of each diode) from the voltage dividers. In this example, each transistor base is connected to its diode while the collector is connected to the voltage plus bus 551 and the emitter is connected to an indicating lamp 640, 641, 642, etc., which is grounded on the other side. Each transistor is also connected to the plus voltage bus 551 through a resistor 650, 651, 652, etc. that biases the transistor to its off position until a signal is received. Resistors 660, 661, 662, etc. are connected to ground and bias the base above ground. There may be as many lamp circuits as desired, preferably arranged in a row or column as in FIG. 16.

As a further addition, there may be an audible alarm 670 and a master warning light 671 operated by a relay 672 with normally open contacts 673 and 674. The relay 672 is energized at the same time as one of the lights, here the lamp 642, preferably the first light which is intended to give a significant warning signal.

FIG. 18 shows another modified form of circuit, based upon the circuit of FIG. 17. Here, the ordinary incandescent lights 641, 642, etc. of FIG. 17 are replaced by a "nixie"-type of lamp. A glass envelope 700 contains neon or other suitable gas and has a grounded common electrode 701. It also contains a series of wire electrodes 702, 703, 704, 705, 706, 707, 708, 709, 710, 711, 712, 713, 714, and 715. While each of these electrodes may be in a different figuration, preferably each is a separate bar, and the bars are arranged in a vertical column or a horizontal row. Each of these electrodes is connected through an individual resistor 716, 717, 718, 719, 720, 721, 722, 723, 724, 725, 726, 727, 728, 729, to an emitter of one of the switching transistors 630, 631, 632, etc. These resistors limit the current in each circuit, and the value of the resistors controls the brightness achieved in the nixie tube 700. The voltage requirement is higher than that needed for the incandescent lamps shown in FIG. 17, being typically about 100 volts, but the current requirement is much lower, being only a few milliamperes in each electrode.

Thus, when voltage is applied to any wire electrodes 702 through 715 and energizes it, the gas near its surface is ionized and glows like a neon lamp, making a horizontal line across the face of the indicator. Various marks or masks may be applied, including a transparent colored plastic in front of the indicator, and the lamps may go on successively as already discussed in connection with FIG. 16.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A temperature detection circuit of the type including in combination, first resistance means variable with ambient temperature and extending over a substantial area, a temperature-detecting sensor extending over said area, an electrical switch normally in one of its open and closed states actuated by said sensor to the other of its states at a predetermined critical temperature, and a single electrical current-responsive indicator means in series with said switch and variable resistance, said circuit also comprising in combination: second resistance means of a predetermined fixed value which is effectively placed in said circuit in series with said indicator means and variable resistance only when said switch is in the other of said states, said indicator means including means responsive to the current amplitude in said circuit for giving a different indication for each of the following conditions:
  1. when the switch is in the other of its states,
  2. when the circuit from said indicator means leading to said switch is open,
  3. when the circuit from said indicator means leading to said switch is shorted, and
  4. the ambient temperature as sensed by the variable resistance, when all of the preceding conditions are absent.

2. The circuit of claim 1 wherein said indicator means comprises a ratiometer.

3. The circuit of claim 1 wherein said indicator means comprises a galvanometer.

4. The circuit of claim 1 wherein said indicator means includes a mirror and a light beam reflected by said mirror and a translucent indicator panel to and through which said light beam is reflected.

5. The circuit of claim 4 wherein said panel includes photosensitive means upon which said beam impinges under some conditions and means actuated by impingement of said beam upon said photosensitive means.

6. The circuit of claim 1 wherein there are a plurality of said sensors with their switches in series with each other and with said indicator means and a corresponding plurality of said second resistance means one for each said switch.

7. The circuit of claim 6 wherein each said second resistance means has a different resistance from the others.

8. The circuit of claim 1 wherein said indicator means comprises a bridge circuit including three standard impedances and, as a fourth impedance, the impedance of said sensor, said second resistance means and circuit elements associated with said sensor and second resistance means.

9. The circuit of claim 8 wherein said indicator means includes a voltage sensor for sensing a predetermined voltage level across said bridge, and signal means actuated by said voltage sensor when said level is attained.

10. The circuit of claim 9 having high-voltage cutoff means associated with said voltage sensor for cutting out said voltage sensor quickly before it actuates said signal means whenever the voltage rises above said predetermined level.

11. The circuit of claim 8 wherein said bridge circuit is connected to actuate and control a cathode-ray tube to deflect its beam in a predetermined manner as the indication given.

12. The circuit of claim 11 wherein said cathode-ray tube has a first pair of deflection plates controlled by the voltage across said bridge circuit and a second pair of deflection plates perpendicular to said first pair and controlled by a sweep generator.

13. The circuit of claim 11 wherein said cathode-ray tube has a single pair of deflection plates, actuated by the voltage of said bridge, and has a shield with a slitlike opening through which the beam of electrons passes at all voltages applied to said deflection plates.

14. The circuit of claim 8 wherein a DC amplifier is connected to amplify the voltage across the bridge and to apply it to voltage-responsive means for indication.

15. The circuit of claim 14 wherein said DC amplifier is connected through a series of voltage-level sensors, each set to send a different voltage level to a series of indicator signals, one signal for each voltage-level sensor and actuated thereby.

16. The circuit of claim 14 wherein said DC amplifier is connected to a series of voltage dividers, each said voltage divider being set for a different voltage level of output and said output being connected through a diode to the base of a transistor, each said transistor having an emitter connected to a signal device and a collector connected to a separate power source, said base being connected to said separate power source through a biasing resistor and connected to ground through a biasing resistor.

17. The circuit of claim 16 wherein said signal device comprises a gas-filled tube having a common electrode and a series of separate electrodes, each connected to a different said transistor.

18. The circuit of claim 1 in which the switch is normally closed.

19. A temperature-detecting circuit according to claim 1 in which the first resistance means is so distributed throughout the area as to continuously effect an arithmetical average temperature measurement over a range of temperatures.

20. A temperature-detecting circuit according to claim 19 in which the temperature-detecting sensor has means for effecting a discrete warning indication substantially at one end of such range when the switch is in the other of said states.

PO-1050
(5/69)

UNITED STATES PATENT OFFICE
CERTIFICATE OF CORRECTION

Patent No. 3,603,953      Dated September 7, 1971

Inventor(s) John E. Lindberg, Darrel V. McCoy, Gordon J. Schanck and Harry E. Van Cleef, Jr.

It is certified that error appears in the above-identified patent and that said Letters Patent are hereby corrected as shown below:

In the heading, item [72] Inventors, line 3 "Laffayette" should read -- Lafayette --. Col. 1, line 33, "them" should read -- then --. Col. 2, line 39, "sand" should read -- and --; line 71, "600 F." should read -- 600° F. --. Col. 4, line 2, "resistor" should read -- resistors --; line 67, "millimeters" should read -- milliammeters --. Col. 6, line 2, "through" should read -- though --; line 12, "126, 126" should read -- 126, 127 -- and "is parallel" should read -- is in parallel --; line 18, "145." should read -- 145, --; line 45, "tim delay" should read -- time delay --. Col. 10, before line 1 insert -- which passes between a set 503 of horizontal deflection plates and a set 504 of vertical deflection plates and then impinges at --. Col. 11, before line 1 insert -- and is connected to a series of separate voltage sensors and lights mounted one above the other in a vertical column or --; line 10, "the" should read -- that --; line 31, "542" should read -- 572 --. Col. 12, line 9, "that needed" should read -- that is needed --.

Signed and sealed this 25th day of April 1972.

(SEAL)
Attest:

EDWARD M. FLETCHER, JR.
Attesting Officer

ROBERT GOTTSCHALK
Commissioner of Patents